Patented June 10, 1952

2,600,126

UNITED STATES PATENT OFFICE 2,600,126

HALOGENATED AND NITRO HALOGENATED THIOPHENES AS AGRICULTURAL FUNGICIDES

Kenneth G. Nolan, South Norwalk, and John H. Fletcher, Riverside, Conn., assignors to American Cyanamid Company, New York, N. Y., a corporation of Maine No Drawing. Application May 7, 1947, Serial No. 746,626

1 Claim. (Cl. 167—33)

The present invention relates to fungicides and more particularly to methods and compositions for the control of fungus organisms which attack organic materials.

It has been discovered that the thiophene compounds which conform to the general formula

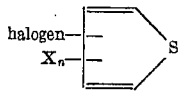

wherein X stands for a member of the group consisting of hydrogen, nitro, and halogen and combinations thereof, and $n$ is an integer of from 1 to 3, possess high fungicidal power and are particularly effective in protecting seeds and seedlings from seed-borne and soil-borne organisms which cause seed rot, seedling blight and damping-off.

As showing the wide diversity of compounds which may be used for the purposes of this invention, the following may be mentioned: 2-chlorothiophene, 2,5-dichlorothiophene, 2,3,5-trichlorothiophene, tetrachlorothiophene, 3-bromothiophene, 2,4-dibromothiophene, 2,3,4-tribromothiophene, tetrabromothiophene, 2 - iodothiophene, 2,5-diiodothiophene, 2,3-diiodothiophene, 2,3,5 - triiodothiophene, 5 - chloro-2,3,4-tribromothiophene, 3-chloro-2,4,5-triiodothiophene, 2,3-dicholor-4,5-dibromothiophene, 2,3-dichloro-4,5-diiodothiophene, 2,5 - dichloro - 3,4-dibromothiophene, 3,4-dichloro-2,5-dibromothiophene, 2,3,4-trichloro-5-bromothiophene, 2,3,5 - trichloro - 4 - iodothiophene, 3-bromo-2,5-diiodothiophene, 2,3-dibromo-5-iodothiophene, 2,5-dibromo - 3,4 - diiodothiophene, 3,4 - dibromo - 2 - iodothiophene, 2,3,5 - tribromo-4-iodothiophene, 4,5-dichloro-2-nitrothiophene, 3,4,5-trichloro-2-nitrothiophene, 2,3,5 - trichloro-4-nitrothiophene, 3-bromo-2-nitrothiophene, 3,5 - dibromo - 2 - nitrothiophene, 2,4,5-tribromo-3-nitrothiophene, 5-iodo-2-nitrothiophene, 4,5-diiodo-2-nitrothiophene, 2,5-dichloro-3,4-dinitrothiophene, 3,4-dibromo-2,5-dinitrothiophene, 2,5 - dibromo - 3,4 - dinitrothiophene, and 3,4-diiodo-2,5-dinitrothiophene.

The more volatile members of the above series of thiophenes may be employed as soil fumigants for preventing or arresting infestations of fungi, molds, and similar noxious organisms. The relatively non-volatile members are eminently suited for protecting seeds from fungus attack. Mixtures of the thiophenes are particularly suited for seed treatment in controlling a complex of both seed-borne and soil-borne organisms.

The thiophene compounds of the present invention may also be used for the protection of plants against fungus organisms which cause defoliation, leaf blight, mildew, fruit rot and the like.

Corn seeds infected with Diplodia zeae were treated with dusts consisting of equal parts of representative thiophene compounds as listed below and talc in the proportion of 2 oz. of dust per bushel of corn. The treated seeds were placed between moist blotters in a germination cabinet for a period of 7 days, the temperature of the cabinet being maintained at about 75° C. Excellent control of the root rot organism was obtained with either tetrabromothiophene, 2,5-dichloro-3,4-dinitrothiophene, or 2,3,5-tribromo-4-nitrothiophene. Saprophytic fungi, such as the Penicillium, Aspergillus and Rhizopus species present on the corn seed, were also controlled by such compounds as 2,5-dibromo-3,4-dinitrothiophene, 2,5 - dichloro - 3,4 - dinitrothiophene and 2,5 - dichloro-3-bromo-4-nitrothiophene.

Barley seeds infected with Gibberella and Helminthosporium, organisms causing seedling blight of small grains, were treated with dusts containing the thiophenes in the proportion of 2 oz. of dust per bushel of seed. The treated seeds were planted in field plots with approximately 250 seeds per plot, using four replications per treatment. Table 1 gives the total number of seedlings which emerged from each treatment.

*Table 1*

| Dust | Per cent | Barley Seedlings |
|---|---|---|
| 1. None (untreated seed) | | 633 |
| 2. 2,5-dichloro-3,4-dinitrothiophene | 25 | 849 |
| talc | 75 | |
| 3. 2,5-dichloro-3,4-dibromothiophene | 25 | |
| 2,5-dichloro-3,4-dinitrothiophene | 25 | 822 |
| talc | 50 | |
| 4. 2,3,5-tribromo-4-nitrothiophene | 25 | |
| 2,5-dichloro-3,4-dinitrothiophene | 25 | 864 |
| talc | 50 | |
| 5. 2,5-dichloro-3,4-dinitrothiophene | 25 | |
| tetrabromothiophene | 25 | 853 |
| talc | 50 | |

Wheat seeds heavily infected with Helminthosporium were treated with dusts containing the thiophenes in the proportion of 2 oz. of dust per bushel of seed. The treated seeds were planted in field plots with approximately 250 seeds per plot, using four replications per treatment. Table 2 gives the total number of seedlings which emerged from each treatment.

*Table 2*

| Dust | Per cent | Wheat Seedlings |
|---|---|---|
| 1. None (untreated seed) | | 242 |
| 2. 2,5-dichloro-3,4-dinitrothiophene | 25 | 396 |
|    talc | 75 | |
| 3. 2,5-dichloro-3,4-dibromothiophene | 25 | 410 |
|    2,5-dichloro-3,4-dinitrothiophene | 25 | |
|    talc | 50 | |
| 4. 2,5-dichloro-3,4-dinitrothiophene | 25 | 393 |
|    tetrabromothiophene | 25 | |
|    talc | 50 | |
| 5. 2,5-dichloro-3,4-dinitrothiophene | 25 | 385 |
|    2,3,5-tribromo-4-nitrothiophene | 25 | |
|    talc | 50 | |

Corn seeds were treated with dusts containing the thiophenes in the proportion of ¾ oz. of dust per bushel of seed. The treated seeds were planted in field plots with approximately 100 seeds per plot, using four replications per treatment. The soil was known to be infested with a number of fungus organisms including Pythium species. Table 3 gives the per cent emergence or stand of seedlings from each treatment.

*Table 3*

| Dust | Per cent | Per cent emergence of corn seedlings |
|---|---|---|
| 1. None (untreated seed) | | 44.0 |
| 2. 2,5-dichloro-3,4-dinitrothiophene | 25 | 77.8 |
|    talc | 75 | |
| 3. 2,5-dichloro-3,4-dibromothiophene | 25 | 80.0 |
|    2,5-dichloro-3,4-dinitrothiophene | 25 | |
|    talc | 50 | |
| 4. 2,3,5-tribromo-4-nitrothiophene | 25 | 82.0 |
|    2,5-dichloro-3,4-dinitrothiophene | 25 | |
|    talc | 50 | |
| 5. 2,5-dichloro-3,4-dinitrothiophene | 25 | 74.5 |
|    tetrabromothiophene | 25 | |
|    talc | 50 | |

Pea seeds (variety Perfection) were treated with dusts containing the thiophenes in the proportion of one part of dust per 500 parts of seed on a weight basis. The treated seeds were planted in Pythium infested soil in plots with ten seeds per plot, using five replications per treatment. Table 4 gives the per cent emergence or stand of seedlings from each treatment, counts being made fourteen days after planting.

*Table 4*

| Dust | Per cent | Per cent emergence of pea seedlings |
|---|---|---|
| 1. None (untreated seed) | | 00.0 |
| 2. 2,5-dichloro-3,4-dinitrothiophene | 25 | 80.0 |
|    talc | 75 | |
| 3. tetrabromothiophene | 25 | 84.0 |
|    2,5-dichloro-3,4-dinitrothiophene | 25 | |
|    talc | 50 | |
| 4. 2,5-dichloro-3,4-dinitrothiophene | 25 | 92.0 |
|    2,3,5-tribromo-4-nitrothiophene | 25 | |
|    talc | 50 | |

The ability of the thiophenes to protect seeds from fungus attack is further demonstrated by the data given in Table 4. No germination of the non-dusted pea seed occurred, whereas from 80 to 92% of the treated seeds germinated and developed into plants.

Seeds of other plants which may be advantageously protected from attack by fungus diseases in accordance with this invention include oats, rye, cotton, beets, tomatoes and beans.

In addition to being highly efficacious against seed-borne and soil-borne organisms, the thiophenes of the present invention may be employed for many purposes of preserving and disinfecting, for example, the preservation of wood, the prevention of mildew formation, the preservation of glue, the preservation of paints and the prevention of fungus attack on cloth, rubber, leather, rope, paper, resins, and the like, using those normally liquids as such and others in solution or suspension, and those normally solids as such.

Although the above thiophenes may be used alone as fungicides, it is usually preferable to mix them with, or adsorb or absorb them on an inert carrier or a spreading material such as talc, bentonite, fuller's earth, pumice, silica, silicates, chalk, wood flour and the like. The thiophenes may also be used admixed with carriers that are active of themselves, for example, other fungicides, insecticides, germicides, hormones and fertilizers. The proportion of the thiophene to the carrier may be from 1 to 95% or may be varied in accordance with the particular effects desired and the conditions under which it is to be used. Under some circumstances, it may be desirable to apply the thiophene compound in the form of a solution or suspension in water or other liquid, and the present invention does not preclude such use.

Other substituted thiophenes which may be similarly employed for the control of fungus organisms include 2-methylthiophene, 3-methylthiophene, 2-isopropylthiophene, 2-methyl-3-ethylthiophene, 2,3,4-trimethylthiophene, 2,5-diethylthiophene, 2,3,5-trimethyl-4-ethylthiophene, 2-ethyl-5-isoamylthiophene, 2-methyl-5-n-octylthiophene, 2-benzylthiophene, 2,5-dibenzylthiophene, 2 - methyl - 3,4,5 - triiodothiophene, 2 - methyl - 3,5 - dibromothiophene, 2 - acetylthiophene, 2 - benzoylthiophene, 2 - acetyl - 5 - iodothiophene, 2 - acetyl - 4,5 - dibromothiophene, 2 - acetyl - 3,4,5 - trichlorothiophene, 2 - acetyl - 3 - methyl - 4,5 - dibromothiophene, 2 - benzoyl - 3,4 - dibromothiophene, 2 - benzoyl - 4,5 - diiodothiophene and the like.

While the invention has been described with particular reference to specific embodiments, it is to be understood that it is not to be limited thereto but is to be construed broadly and restricted solely by the scope of the appended claim.

We claim:

A fungicidal composition comprising a thiophene compound of the general formula—

wherein Y stands for halogen, X stands for nitro, $m$ is an integer of from 1 to 3, $n$ is an integer of from 1 to 2, the sum $m+n$ being an integer of from 2 to 4, and a carrier dust therefor.

KENNETH G. NOLAN.
JOHN H. FLETCHER.

(References on following page)

REFERENCES CITED

The following references are of record in the file of this patent:

UNITED STATES PATENTS

| Number | Name | Date |
|---|---|---|
| 1,887,156 | Hessle | Nov. 8, 1932 |
| 1,924,507 | Markowsky | Aug. 29, 1933 |
| 2,100,493 | Smith et al. | Nov. 30, 1937 |
| 2,393,925 | Morris | Jan. 29, 1946 |

FOREIGN PATENTS

| Number | Country | Date |
|---|---|---|
| 347,451 | Great Britain | Apr. 30, 1931 |
| 812,749 | France | May 15, 1937 |

OTHER REFERENCES

Richter, "Organic Chemistry," volume III, P. Blakiston's Son and Co. Philadelphia 1923, pages 21 to 24.

Alles J. Pharm. and Exp. Ther., volume 72, 1941, page 265.

The Dispensatory of the U. S., 22nd edition, J. P. Lippincott Co. Philadelphia 1937, pages 1615–6.

Oil, Paint and Drug Reporter, April 12, 1943, page 46.